United States Patent [19]

Miyoshi et al.

[11] Patent Number: 4,687,223
[45] Date of Patent: Aug. 18, 1987

[54] SUSPENSION SYSTEM FOR VEHICLE

[75] Inventors: Akihiko Miyoshi; Hitoshi Nakashima, both of Hiroshima, Japan

[73] Assignee: Mazda Motor Corporation, Hiroshima, Japan

[21] Appl. No.: 720,806

[22] Filed: Apr. 8, 1985

[30] Foreign Application Priority Data

Apr. 11, 1984 [JP] Japan .................................. 59-73749
Apr. 11, 1984 [JP] Japan .................................. 59-73750

[51] Int. Cl.⁴ ............................................ B60G 17/08
[52] U.S. Cl. ..................................... 280/707; 180/142
[58] Field of Search ............. 280/6 R, 6 H, 707, 708, 280/688; 180/41, 141–143

[56] References Cited

U.S. PATENT DOCUMENTS

| | | | |
|---|---|---|---|
| 4,364,574 | 12/1982 | Saito | 280/707 |
| 4,368,900 | 1/1983 | Beusse | 280/707 |
| 4,390,187 | 6/1983 | Maeda | 280/707 |
| 4,506,909 | 3/1985 | Nakashima et al. | 280/707 |
| 4,555,126 | 11/1985 | Ishimitsu et al. | 280/703 |
| 4,566,718 | 1/1986 | Kanai et al. | 280/707 |
| 4,575,116 | 3/1986 | Miyata | 280/707 |

FOREIGN PATENT DOCUMENTS 205432 12/1982 Japan .

Primary Examiner—Richard A. Bertsch
Attorney, Agent, or Firm—Gerald J. Ferguson, Jr.; Michael P. Hoffman; Ronni S. Malamud

[57] ABSTRACT

In a suspension system for a vehicle, suspension arms are connected to the vehicle body by way of rubber bushings. The bushings are provided with an adjustment device for changing the resistance of the bushings in the longitudinal direction of the vehicle body. A control circuit is provided to control the adjustment device so that the resistance of the bushings in the longitudinal direction of the vehicle body is increased as the steering angle is increased and/or as the vehicle speed is increased.

19 Claims, 8 Drawing Figures

SUSPENSION SYSTEM FOR VEHICLE

BACKGROUND OF THE INVENTION

1. Field of the Invention

This invention relates to a suspension system for a vehicle, and more particularly to a bushing mounted on a suspension arm of a suspension system for a vehicle.

2. Description of the Prior Art

In the suspension system for a vehicle, the suspension arm is generally connected to the vehicle body by way of a rubber bushing in order to prevent transmission of vibration to the vehicle body. The stiffness of the rubber portion of the rubber bushing cannot generally be changed. Therefore, when a softer bushing is used for improvement of driving comfort, the supporting rigidity of the suspension is reduced and the steering performance is lowered when the steering wheel is turned by a large angle, and at the same time, the running stability during straight travel at high speed is adversely affected. On the other hand, when a stiffer bushing is used for improving the steering performance and the running stability during high speed straight travel, the driving comfort is sacrificed.

Though there has been proposed a suspension bushing in which a hydraulic pressure chamber is provided in the rubber portion and the deformation of the rubber portion can be controlled by controlling hydraulic pressure to be delivered to the hydraulic pressure chamber (See Japanese Unexamined Utility Model Publication No. 57(1982)-98909, for example.), this suspension bushing is disadvantageous in that the parts associated therewith are complicated in structure since the hydraulic pressure to be delivered to the hydraulic pressure chamber of the bushing is supplied from a power cylinder of a power steering system.

SUMMARY OF THE INVENTION

In view of the foregoing observations and description, the primary object of the present invention is to provide an improved suspension system for a vehicle in which the supporting rigidity of the suspension can be changed according to the operating condition of the vehicle.

Another object of the present invention is to provide an improved suspension system for a vehicle in which the resistance of the rubber bushings against a movement in the longitudinal direction of the vehicle body can be changd according to the operating condition of the vehicle so that good driving comfort can be normally ensured and good steering performance or good running stability can be ensured in case of necessity, that is, so that as the steering angle is increased or as the vehicle speed is increased, the resistance of the rubber bushings is increased to improve the steering performance or the running stability.

Another object of the present invention is to accomplish the above objects without complicating the structure.

In accordance with the present invention, the bushings for connecting the suspension arm to the vehicle body are provided with an adjustment means for changing the resistance of the bushings in the longitudinal direction of the vehicle body, and a control means is provided to control the adjustment means according to the steering angle and/or the vehicle speed.

In a preferred embodiment of the present invention, said adjustment means comprises at least two liquid chambers which are formed in the bushing spaced from each other in the longitudinal direction of the vehicle body and connected with each other by way of a connecting passage, and a passage area changing means for changing the effective cross-sectional area of the connecting passage.

Figure 1:
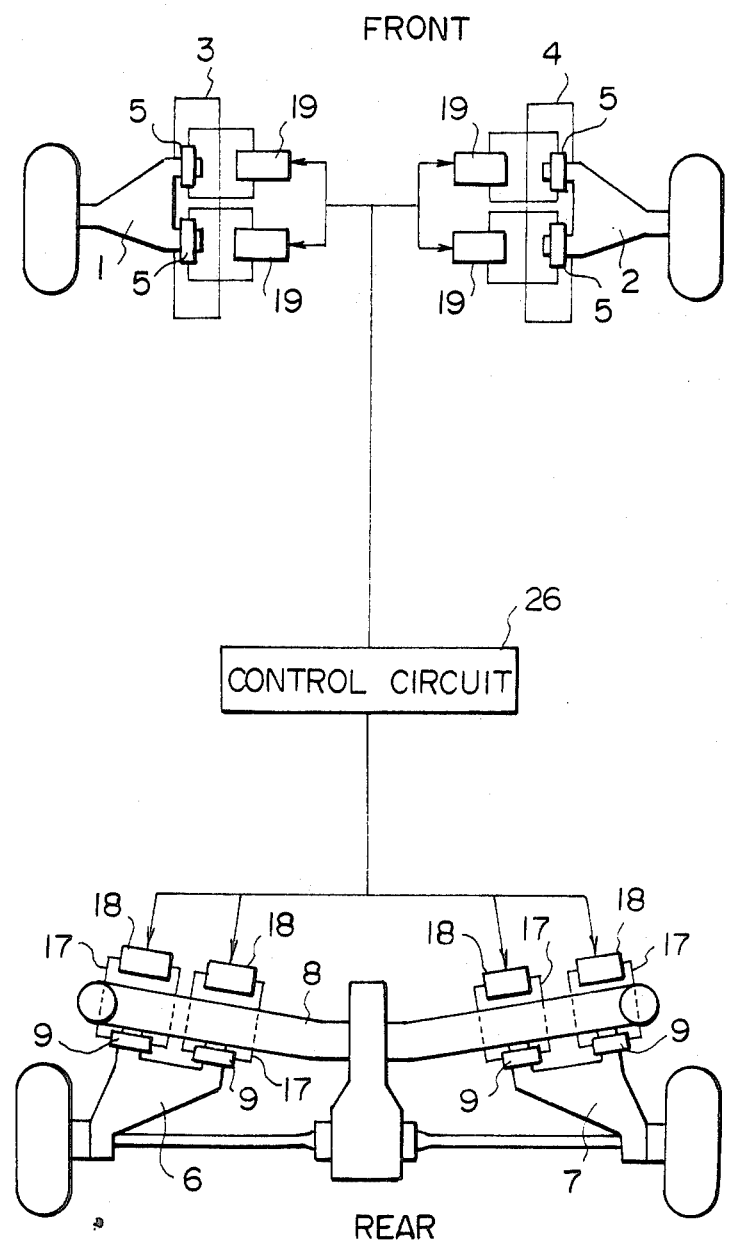
FIG. 1 is a schematic view showing the general structure of a suspension system in accordance with the present invention.

DESCRIPTION OF THE PREFERRED EMBODIMENTS in FIG. 1, left and right front suspension arms 1 and 2 are respectively connected to left and right front side frames 3 and 4 extending in the longitudinal direction of the vehicle body by way of front bushings 5 the central axes of which extend substantially in the longitudinal direction of the vehicle body. Left and right rear suspension arms 6 and 7 are connected to a cross member 8 extending in the transverse direction of the vehicle body by way of rear bushings 9.

Figure 2:
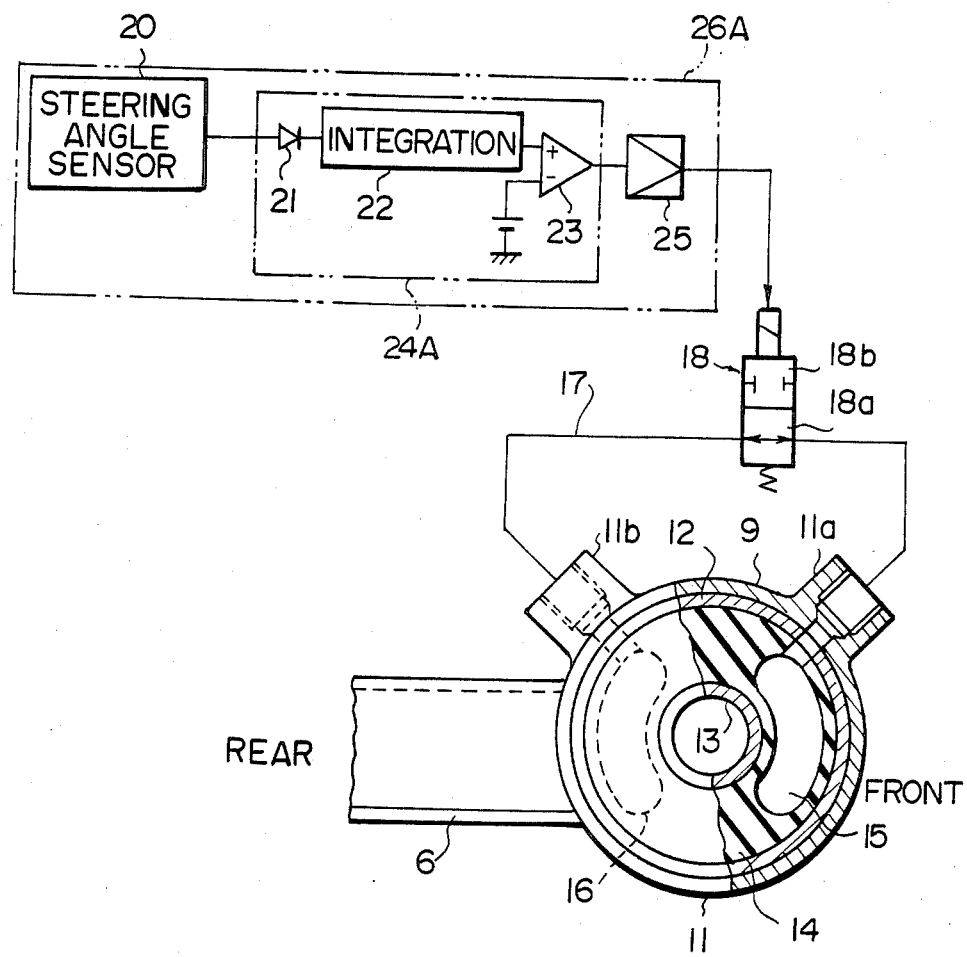
FIG. 2 is a schematic view for illustrating one aspect of a suspension system in accordance with an embodiment of the present invention.

As shown in FIG. 2, each rear bushing 9 comprises a cylindrical casing 11 fixed to the rear suspension arm 6 (or 7), and a rubber 14 which is fixedly inserted between an outer tubular member 12 and an inner tubular member 13 and is accommodated in the casing 11 together with the outer and inner tubular members 12 and 13. In the rubber 14, a pair of oil chambers 15 and 16 are formed diametrically opposed to each other in the longitudinal direction of the vehicle body. The oil chambers 15 and 16 are arcuate in the circumferential direction and are symmetrical with each other. The oil chambers 15 and 16 are communicated with each other by way of a connecting passage 17 which extends to the oil chambers 15 and 16 through openings 11a and 11b of the casing 11 and through the outer tubular member 12 and the rubber 14. In the connecting passage 17 is disposed a solenoid valve 18 which can take an open position 18a and a closure position of 18b.

The front bushing 5 has a pair of oil chambers (not shown) formed symmetrically with each other and spaced from each other in the longitudinal direction of the vehicle body. The oil chambers are communicated with each other by way of a connecting passage which is provided with a solenoid valve 19 which is the same in structure as the solenoid valve 18 for the rear bushing 9.

A control circuit 26 controls the solenoid valves 18 and 19 according to the operating condition of the vehicle as will be described in detail later.

In the embodiment shown in FIG. 2, the control circuit 26A controls the solenoid valves 18 and 19 according to the steering angle. In FIG. 2, a control circuit 26A comprises a steering angle sensor 20, a calculating section 24A and a valve driver 25 for driving the solenoid valves 18 and 19. Though the solenoid valves 19 are not shown in FIG. 2 and only a single solenoid valve 18 is shown for the sake of simplicity, the valve driver 25 is connected to all the solenoid valves 18 and 19. The calculating section 24A comprises a diode 21, an integrating circuit 22 and a comparator 23 connected in series in this order.

When a steering angle signal is input to the calculating section 24A from the steering angle sensor 20, the calculating section 24A determines whether or not the actual steering angle is larger than a preset value. When the actual steering angle is smaller than the preset value, the output of the comparator 23 is at low level and accordingly the valve driver 25 is not actuated. When the valve driver 25 is not actuated, the solenoid valves 18 and 19 are not energized and are held in their open position where they permit oil to move back and forth between the oil chambers 15 and 16. In this case, the bushings 5 and 9 are deformed in the longitudinal direction of the vehicle body under a relatively small force and the resistance of the bushings 5 and 9 against a movement in the longitudinal direction is relatively weak, whereby good driving comfort can be obtained.

On the other hand, when the calculating section 24A determines that the actual steering angle is not smaller than the preset value, the output of the comparator 23 becomes high level to actuate the valve driver 25, whereby the solenoid valves 18 and 19 are energized to move to their closure position where they inhibit flow of oil between the oil chambers 15 and 16. In this case, the resistance of the bushings 5 and 9 against a movement in the longitudinal direction of the vehicle body is enhanced and accordingly the steering performance at a large steering angle is improved.

Figure 3:
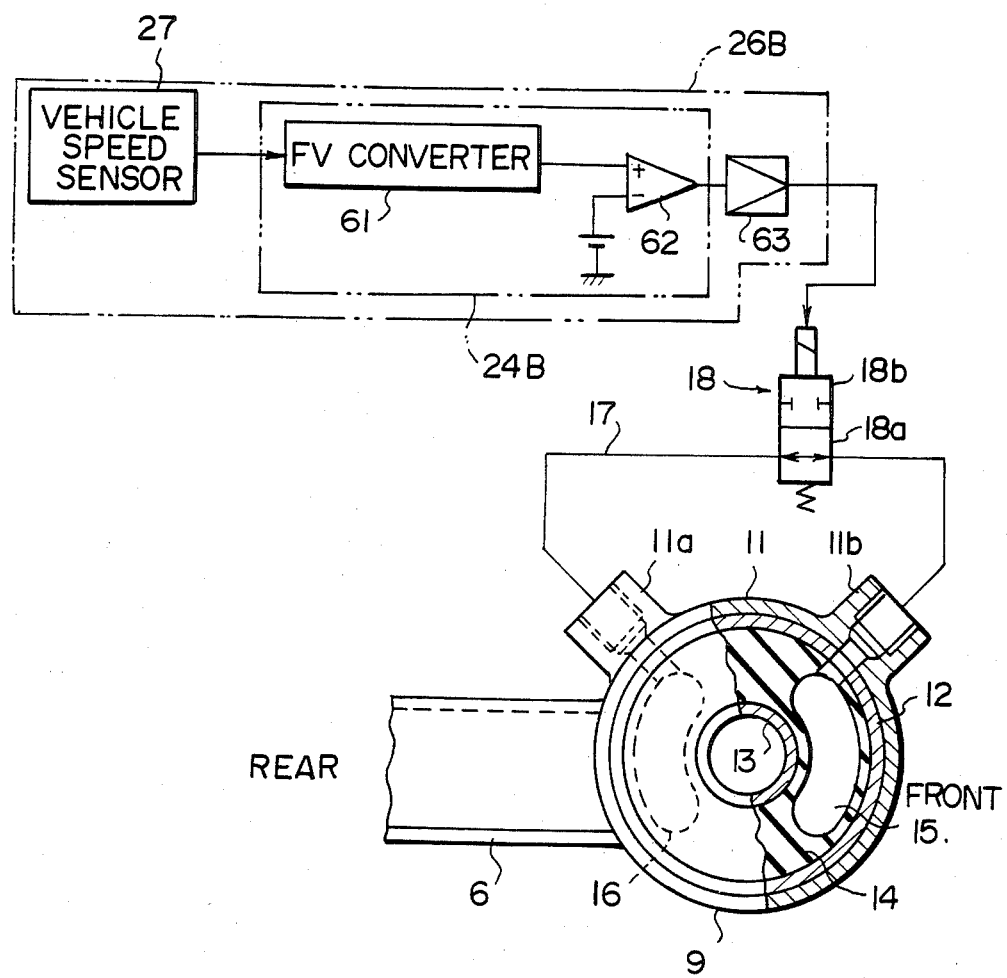
FIG. 3 is a schematic view for illustrating one aspect of a suspension system in accordance with another embodiment of the present invention.

FIG. 3 shows another embodiment of the present invention in which the resistance of the bushings 5 and 9 against a movement in the longitudinal direction of the vehicle body is changed according to the vehicle speed in order to ensure good driving comfort during low to middle speed travel and at the same time to improve running stability during high speed straight travel. In FIG. 3, a control circuit 26B comprises a vehicle speed sensor 27, a calculating section 24B and a valve driver 63. The calculating section 24B comprises an FV converter 61 and a comparator 62 connected in series with each other.

When a vehicle speed signal is input to the calculating section 24B from the vehicle speed sensor 27, the calculating section 24B determines whether or not the actual vehicle speed in higher than a preset value. When the actual vehicle speed is lower than the preset value, the output of the comparator 62 is at low level and accordingly the valve driver 63 is not actuated. When the valve driver 63 is not actuated, the solenoid valves 18 and 19 are not energized and are held in their open position where they permit oil to move back and forth between the oil chambers 15 and 16. In this case, the bushings 5 and 9 are deformed in the longitudinal direction of the vehicle body under a relatively small force and the resistance of the bushings 5 and 9 against a movement in the longitudinal direction of the vehicle body is relatively weak, whereby a good driving comfort can be obtained.

On the other hand, when the calculating section 24B determines that the actual vehicle speed is not lower than the preset value, the output of the comparator 62 becomes high level to actuate the valve driver 63, whereby the solenoid valves 18 and 19 are energized to move to their closure position where they inhibit flow of oil between the oil chambers 15 and 16. In this case, the resistance of the bushings 5 and 9 against a movement in the longitudinal direction of the vehicle body is enhanced and accordingly the running stability during high speed travel can be improved.

Figure 4:
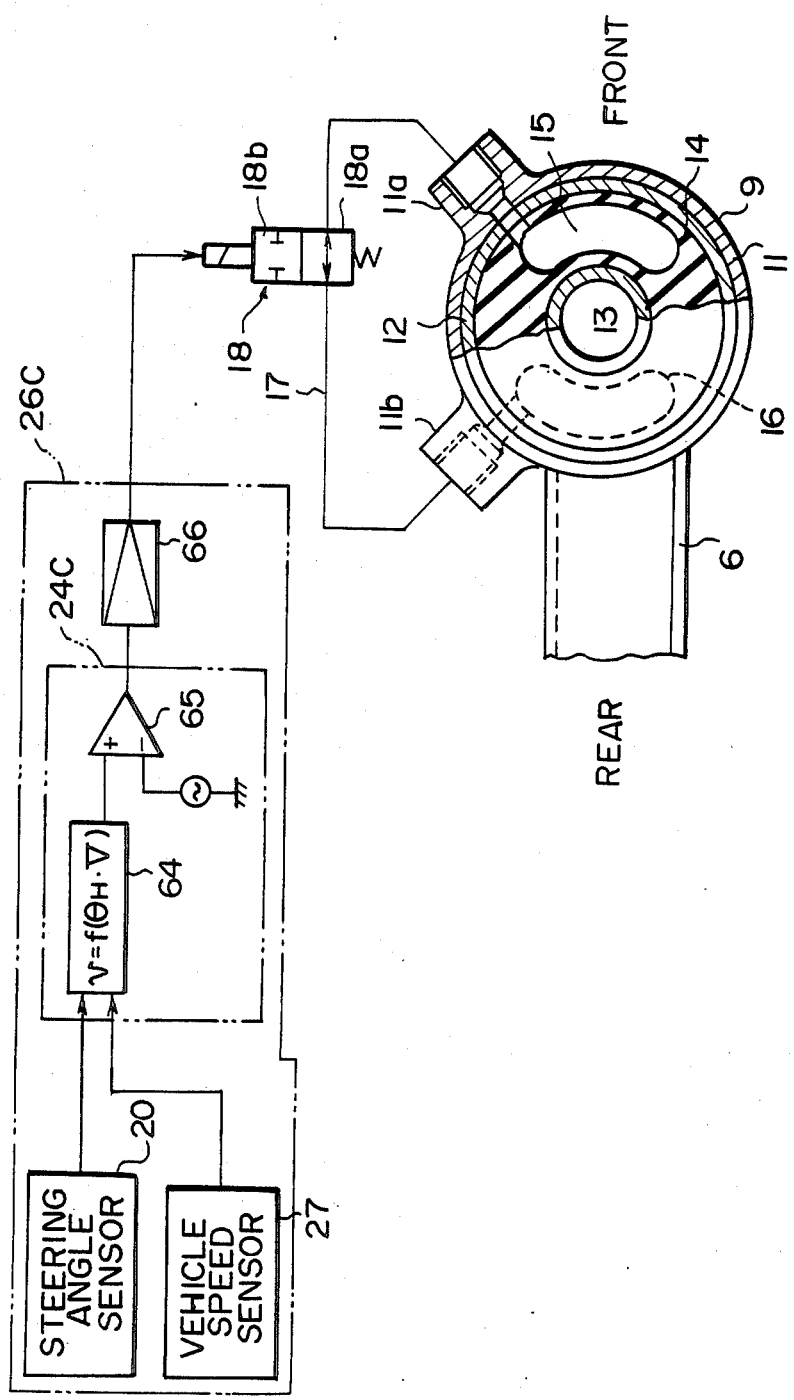
FIG. 4 is a schematic view for illustrating one aspect of a suspension system in accordance with still another embodiment of the present invention.

FIG. 4 shows still another embodiment of the present invention in which the resistance of the front and rear bushings 5 and 9 against a movement in the longitudinal direction of the vehicle body is changed according to both the steering angle and the vehicle speed. In this embodiment, a control circuit 26C comprises a steering angle sensor 20, a vehicle speed sensor 27, a calculating section 24C and a valve driver 66. The calculating section 24C comprises a converter 64 and a comparator 65 connected in series with each other. The converter 64 outputs a signal according to both the output signal of the steering angle sensor 20 and the output of the vehicle speed sensor 27 and the comparator 65 compares the output signal of the converter 64 with a reference triangular wave, thereby duty-controlling the solenoid valves 18 and 19. In this case, the preset value for the steering angle is set to be larger during high speed travel than during low speed travel so that the running stability during high speed travel is improved and the stability during lane-changing is increased. In addition to the steering angle, the rate of change of the steering angle or the acceleration of the steering angel may be used as a control factor in order to increase controlling accuracy.

Figure 5:
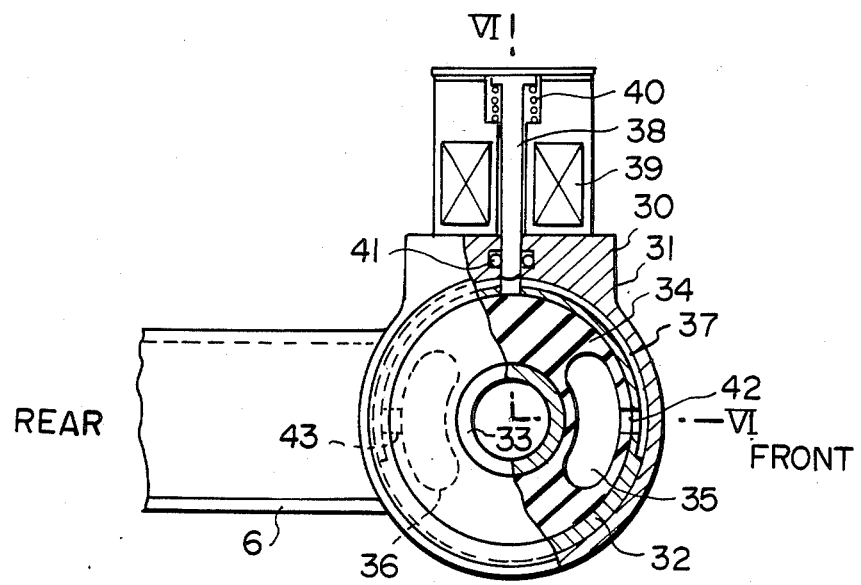
FIG. 5 is a view for illustrating another example of the rear bushing which can be employed in the present invention.
Figure 6:
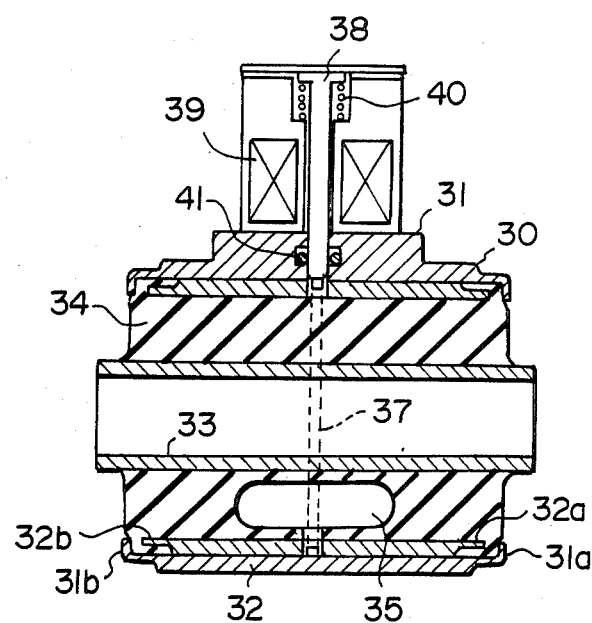
FIG. 6 is a cross-sectional view taken along line VI—VI in FIG. 5.

FIGS. 5 and 6 show another example of the rear bushing which can be employed in the present invention. The rear bushing 30 shown in FIGS. 5 and 6 comprises a cylindrical casing 31 fixed to the rear suspension arm 6 (or 7), and a rubber 34 which is fixedly inserted between an outer tubular member 32 and an inner tubular member 33, and is accommodated in the casing 31 together with the outer and inner tubular members 32 and 33. In the rubber 34, a pair of oil chambers 35 and 36 are formed diametrically opposed to each other in the longitudinal direction of the vehicle body as in the rear bushing 9 shown in FIG. 2. The oil chambers 35 and 36 are connected with each other by way of a connecting groove 37 formed in the inner surface of the outer tubular member 32, a communicating hole 42 which communicates the oil chamber 35 with the connecting groove 37, and a communicating hole 43 which communicates the oil chamber 36 with the connecting groove 37. A rod 38 is mounted on the casing 31 to be movable in the radial direction of the bushing 30 between an open position in which it is retracted away from the connecting groove 37 to open the same and a closure position in which it is inserted into the connecting groove 37 to close the same. That is, the rod 38 is moved to the closure position when a solenoid 39 is energized and is returned to the open position under the force of a return spring 40 when the solenoid 39 is de-energized. The opposite ends of the casing 31 are respectively provided with annular flanges 31a and 31b respectively opposed to ends 32a and 32b of the outer tubular member 32 in order to limit movement of the outer tubular member 32 due to an extreme deformation of the rubber 34. Reference numberal 41 denotes a sealing member.

Figure 7:
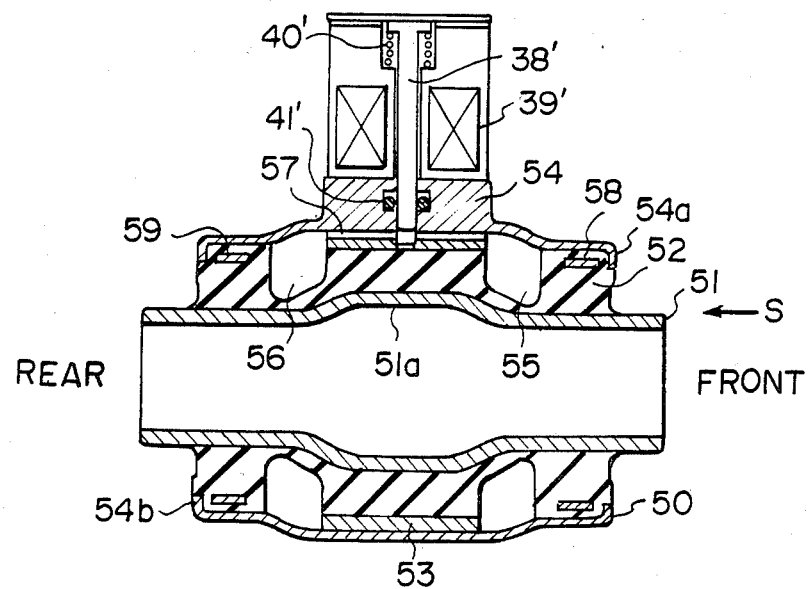
FIG. 7 is a view for illustrating another example of the front bushing which can be employed in the present invention.
Figure 8:
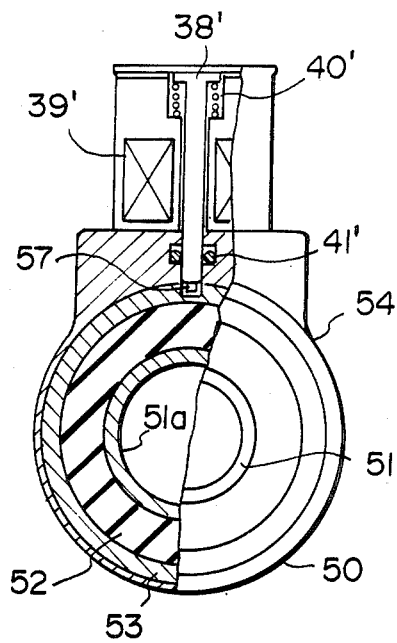
FIG. 8 is an end view partly in cross section as seen in the direction of the arrow S in FIG. 7.

FIGS. 7 and 8 show another example of the front bushing which can be employed in the present invention. The front bushing 50 shown in FIGS. 7 and 8 includes an inner tubular member 51 having a larger diameter portion 51a. A rubber 52 is fixedly mounted around the inner tubular member 51 and an outer tubular member 53 is fixedly mounted around the rubber 52 at a portion corresponding to the larger diameter portion 51a of the inner tubular member 51. Further a casing 54 is provided to surround the rubber 52 over the outer tubular member 53. A pair of annular oil chambers 55 and 56 are formed in the rubber 52 on opposite sides of the outer tubular member 53. The oil chambers 55 and 56 are connected with each other by way of a connecting groove 57 formed in the outer surface of the outer tubular member 53. Similarly to the rear bushing 30 shown in FIGS. 5 and 6, a rod 38' is mounted on the casing 54 to be movable in the radial direction of the bushing 50 between an open position in which it is retracted from the connecting groove 57 to open the same and a closure position in which it is inserted into the connecting groove 57 to close the same. That is, the rod 38' is moved to the closure position when a solenoid 39' is energized and is returned to the open position under the force of a return spring 40' when the solenoid 39' is de-energized.

Auxiliary tubular members 58 and 59 are embedded in the rubber 52 respectively in front of the oil chamber 55 and behind the oil chamber 56. The opposite ends of the casing 54 are respectively provided with inwardly extending annular flanges 54a and 54b which are respectively opposed to the auxiliary tubular members 58 and 59.

Though in the above embodiments, the connecting passage between the oil chambers is completely closed when the resistance of the front and rear bushings is to be enhanced, a similar effect can be obtained by partly closing the connecting passage. Though in the above embodiments, A-type arms are used as the suspension arms, link type arms may instead be used.

Further, though in the above embodiments, the stiffness of the bushings is changed by selectively opening and closing the communicating passage between the two oil chambers, a similar effect can be obtained by providing an oil pump and controlling the amount of oil to be fed to the oil chambers.

We claim:

1. A suspension system for a vehicle comprising a suspension arm connected to the vehicle body by way of a bushing, an adjustment means for changing the resistance of the bushing against a movement in the longitudinal direction of the vehicle body, a steering angle sensor for detecting the turning angle of the steering wheel of the vehicle, a vehicle speed sensor for detecting the speed of the vehicle, and control means for controlling the adjustment means to increase the hardness of the bushing against a movement in the longitudinal direction of the vehicle body as at least one of the steering angle and the vehicle speed is increased.

2. A suspension system as defined in claim 1 in which said adjustment means comprises at least two liquid chambers formed in the bushing spaced from each other in the longitudinal direction of the vehicle body, a connecting passage for communicating the liquid chambers with each other, and a passage area changing means for changing the effective cross-sectional area of the connecting passage.

3. A suspension system as defined in claim 2 in which said control means comprises a calculating circuit which receives output signals from the steering angle sensor and the vehicle speed sensor and outputs a signal when the steering angle and the vehicle speed are not smaller than preset values, and a driver means for driving the passage area changing means according to the output signal of the calculating circuit.

4. A suspension system as defined in claim 3 in which said calculating circuit comprises a converter which outputs a signal corresponding to the output signals of the steering angle sensor and the vehicle speed sensor, and a comparator which determines whether or not the steering angle and the vehicle speed are not smaller than the preset values on the basis of the output signal of the converter and outputs a signal when the steering angle and the vehicle speed are not smaller than the preset values.

5. A suspension system for a vehicle comprising a suspension arm connected to the vehicle body by way of a bushing, an adjustment means for changing the resistance of the bushing against a movement in the longitudinal direction of the vehicle body, a vehicle speed sensor for detecting the speed of the vehicle, and control means for controlling the adjustment means to increase the resistance of the bushing against a movement in the longitudinal direction of the vehicle body with increase in the vehicle speed.

6. A suspension system as defined in claim 5 in which said adjustment means comprises at least two liquid chambers formed in the bushing spaced from each other in the longitudinal direction of the vehicle body, a connecting passage for communicating the liquid chambers with each other, and a passage area changing means for changing the effective cross-sectional area of the connecting passage.

7. A suspension system as defined in claim 6 in which said control means comprises a calculating circuit which receives an output signal of the vehicle speed sensor and outputs a signal when the vehicle speed is not smaller than a preset value, and a driver means for driving the passage area changing means according to the output signal of the calculating circuit.

8. A suspension system as defined in claim 7 in which said calculating circuit comprises an FV converter and a comparator.

9. A suspension system as defined in claim 6 in which said bushing comprises an outer tubular member, an inner tubular member and a rubber body fixed between the outer and inner tubular members and is disposed so that its central axis extends in the transverse direction of the vehicle body, and said liquid chambers are formed in the rubber body on opposite sides of the inner tubular member.

10. A suspension system as defined in claim 9 in which said connecting passage extends outside the outer tubular member and said passage area changing means comprises a solenoid valve disposed outside the outer tubular member to change the effective cross-sectional area of the connecting passage.

11. A suspension system as defined in claim 9 in which said bushing is accommodated in a casing and said connecting passage is formed by a groove formed between the outer surface of the outer tubular member and the inner surface of the casing, said passage area changing means comprising a rod member which is adapted to be moved into and away from the groove in the radial direction of the bushing to change the effective area of the groove.

12. A suspension system as defined in claim 11 in which said groove is formed in the outer surface of the outer tubular member.

13. A suspension system as defined in claim 6 in which said bushing comprises an outer tubular member, an inner tubular member and a rubber body fixed between the outer and inner tubular members, and is disposed so that its central axis extends in the longitudinal direction of the vehicle body, and said liquid chambers are formed in the rubber body spaced apart from each other by a predetermined distance, and are annular in shape to surround the inner tubular member.

14. A suspension system for a vehicle comprising a suspension arm connected to the vehicle body by way of a bushing, an adjustment means for changing the resistance of the bushing against a movement in the longitudinal direction of the vehicle body, a steering angle sensor for detecting the turning angle of the steering wheel of the vehicle, and control means for controlling the adjustment means to increase the resistance of the bushing against a movement in the longitudinal direction of the vehicle body with increase in the steering angle.

15. A suspension system as defined in claim 14 in which said adjustment means comprises at least two liquid chambers formed in the bushing spaced from each other in the longitudinal direction of the vehicle body, a connecting passage for communicating the liquid chambers with each other, and a passage area changing means for changing the effective cross-sectional area of the connecting passage.

16. A suspension system as defined in claim 15 in which said control means comprises a calculating circuit which receives an output signal of the steering angle sensor and outputs a signal when the steering angle is not smaller than a preset value, and a driver means for driving the passage area changing means according to the output signal of the calculating circuit.

17. A suspension system as defined in claim 16 in which said calculating circuit comprises an integrating circuit and a comparator.

18. A suspension system as defined in claim 15 in which said bushing comprises an outer tubular member, an inner tubular member and a rubber body fixed between the outer and inner tubular member and is disposed so that its central axis extends in the transverse direction of the vehicle body, and said liquid chambers are formed in the rubber body on opposite sides of the inner tubular member.

19. A suspension system as defined in claim 15 in which said bushing comprises an outer tubular member, an inner tubular member and a rubber body fixed between the outer and inner tubular members, and is disposed so that its central axis extends in the longitudinal direction of the vehicle body, and said liquid chambers are formed in the rubber body spaced apart from each other by a predetermined distance, and are annular in shape to surround the inner tubular member.

\* \* \* \* \*